2,963,470

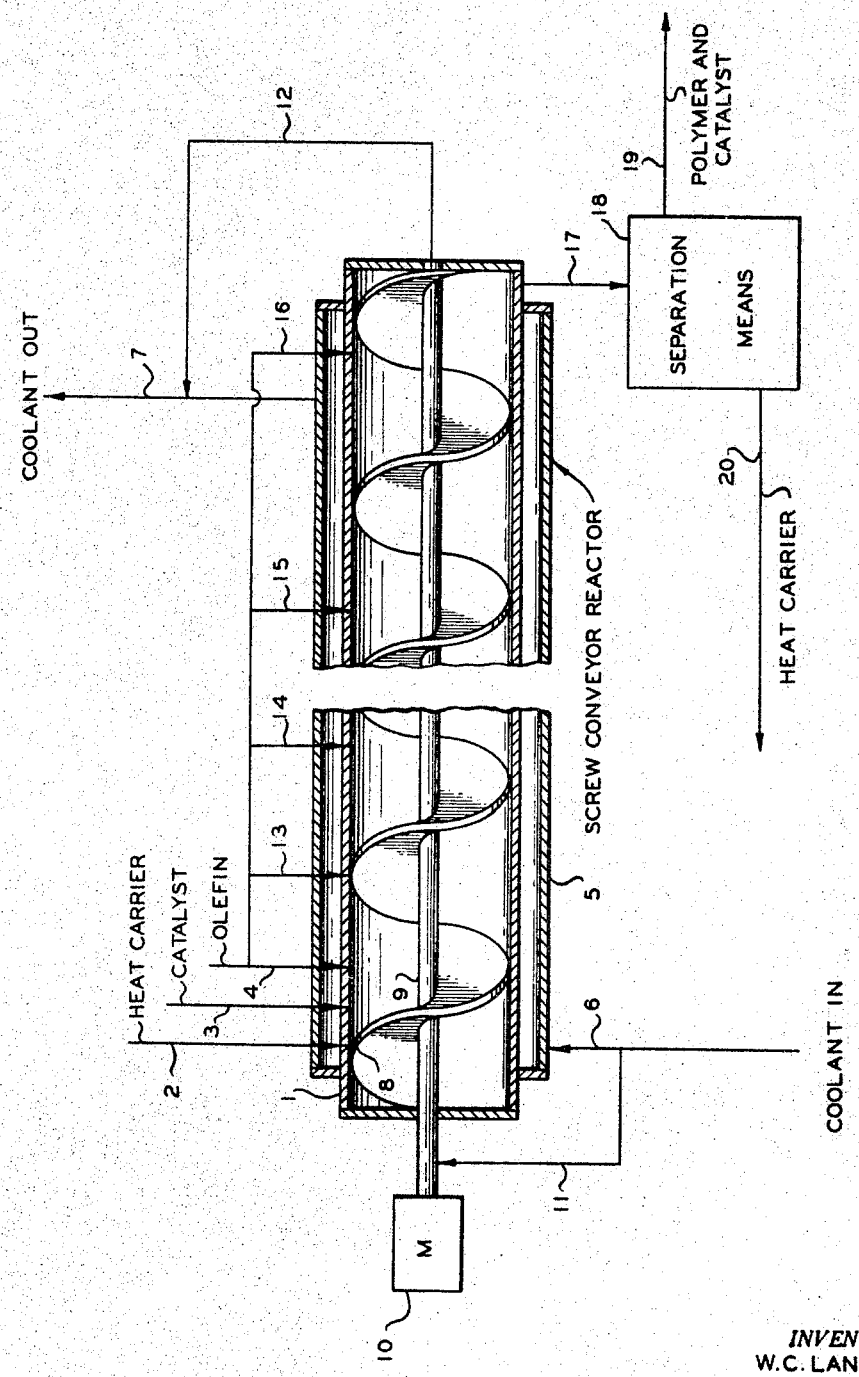

PROCESS FOR POLYMERIZATION OF 1-OLEFINS IN PRESENCE OF SOLID HEAT CARRIER

William C. Lanning, Bartlesville, Okla., assignor to Phillips Petroleum Company, a corporation of Delaware Filed Jan. 22, 1957, Ser. No. 635,359

11 Claims. (Cl. 260—88.2)

This invention relates to the polymerization of aliphatic 1-olefins having a maximum monomer chain length of 8 carbon atoms and no branching nearer the double bond than the 4-position to high molecular weight solid polymer. One aspect of the invention pertains to the polymerization of such 1-olefins in the presence of a heat carrier.

It has recently been discovered that certain olefins, including ethylene, can be polymerized to form normally solid polymers by contacting with a solid catalyst. Such a process is described in detail in the copending application of Hogan and Banks, Serial No. 573,877, filed March 26, 1956, now Patent 2,825,721. As disclosed in that application, the polymerization can be conducted in the gaseous or in the liquid phase at a temperature in the range of 150 to 450° F., in the presence of a catalyst comprising chromium oxide, including a substantial amount of hexavalent chromium, associated with at least one other porous solid, especially an oxide selected from the group consisting of silica, alumina, zirconia and thoria. This catalyst is generally activated at high temperature, i.e., 450–1500° F., preferably 900–1000° F. under non-reducing conditions and preferably in the presence of an oxidizing gas such as dry air. The copending application of Leatherman and Detter, Serial No. 433,801, filed June 1, 1954, discloses a process wherein the polymerization can be conducted in the gaseous phase. The pressure can range from atmospheric to as high as 1000 p.s.i., but pressures in excess of 700 p.s.i. are ordinarily unnecessary. Such 1-olefin polymers are also prepared in the presence of organo-metallic catalyst as disclosed in Belgian Patent 533,362, issued November 16, 1954, to Karl Ziegler.

Gaseous phase operations have several advantages over liquid phase operations. It has the obvious advantage of making it unnecessary to cycle a solvent in the system. In the gas phase operations, as much as 7000 pounds polymer per pound of catalyst has been obtained. With such high production of polymer per pound of catalyst, it is unnecessary to separate polymer from catalyst for even those polymers requiring very low ash content. In general, the practical yield of polymer in solution is limited by the viscosity of the solution at high polymer concentrations. The practical productivity in hydrocarbon slurry is also limited by the maximum polymer concentration permitting stirring and pumping by conventional means.

The polymerization reaction is exothermic for example in polymerizing ethylene 24,000 B.t.u. per pound mole is released. When operating in gaseous phase, it is desirable to operate at a temperature below the softening point of the polymer to prevent agglomeration of the polymer particles and to prevent gumming up on the reactor walls and the like. With the high ratio of polymer per pound of catalyst produced and the high concentration of polymer in the reactor, very large amounts of heat must be removed to maintain the temperature in the low range desired. By the use of this invention, the heat of formation is readily removed. As has been pointed out, gaseous or vapor phase operation has advantage over liquid phase operation, however, the advantage of heat removal by a heat carrier is also obtainable in liquid phase system.

An object of this invention is to provide a method of removing heat of reaction from a polymerization of 1-olefins.

Other objects, advantages and features of this invention will be apparent to those skilled in the art having been given this disclosure.

According to this invention, a solids heat carrier is passed along with 1-olefin monomer and a polymerization catalyst through a polymerization zone at a temperature below the softening point of the polymer being formed.

The heat carrier can be in any desired shape but will generally be in the form of a sphere. Most generally, these spheres will be solid, but hollow spheres or spheres containing a material having a melting point a few degrees below the reaction temperature can be employed. The size of the spheres can vary over a wide range and will, in general, depending upon the size of the reactor, have a diameter from $\frac{1}{16}$ to 2 inches. In the case of steel balls, the carrier can be separated from polymer by magnetic separation means. This heat carrier can be of any inert solid material stable under the polymerization conditions such as clay or ceramic materials, metals such as steel, copper, aluminum, etc., alloys of these materials such as bronze, brass, Monel metal, certain stainless steels and the like. It generally is preferred to use a material of high heat capacity. The amount of heat carrier will depend upon the particular polymerization and the heat capacity of the material. The heat carrier should have a temperature of at least 150° F. in order not to cool the reactant below the desired minimum temperature for the reaction and will generally be about 20° F. below the desired maximum temperature. That is, about a 20° F. rise in temperature, is generally preferred. However, a greater temperature rise can be tolerated so long as the maximum temperature reached is below the softening temperature of the polymer. The volume of heat carrier can vary over a wide range depending upon the heat capacity of the carrier and the allowable temperature rise. I can use as little as 0.1 pound of carrier per pound of polymer produced and up to 20 pounds per pound but generally prefer 1:1 to 5:1 weight parts carrier per part polymer.

As has been indicated, the preferred catalyst of this invention is a chromium oxide polymerization catalyst on a support of the type indicated. The preferred chromium content of the catalyst is in the range of 0.1 to 10 weight percent and it is further preferred that at least 0.1 weight percent of the catalyst be chromium in the hexavalent state. The catalyst is suitable from 40 to 200 mesh, however, I prefer a catalyst which is essentially microspherical, for example, not more than 5 percent retained on 100 mesh and 70 to 90 percent passing 200 mesh. Also, other solid catalysts are particularly adapted to the present invention, however, other type catalysts such as liquid catalyst can be employed, however, these latter catalysts are generally preferred to be used in liquid phase operations.

The 1-olefins to which this invention is applicable are those 1-olefins of up to 8 carbon atoms and having no branching nearer the double bond than the four position. Examples of suitable 1-olefins include ethylene, propylene, 1-butene, 1-pentene, 1-hexene, 1-octene, 4-methyl-1-pentene, 4-methyl-1-hexene, 5-methyl-1-hexene, 6-methyl-1-heptene, 4-ethyl-1-hexene and the like as well as those 1-olefins having additional unsaturation such as butadiene. Either homopolymers or copolymers of these olefins can be prepared by the method of this invention. It is preferred that the polymer being formed is solid and not tacky since tacky polymer will tend to stick to the heat carrier, vessel walls, etc., and special effort will be required to keep these parts clean. Therefore, it is preferred with the chromium oxide catalyst that the polymer be ethylene homopolymer or ethylene containing small amounts of one of the other 1-olefins as are shown above since such polymers are hard and not tacky. In general, larger amounts of low molecular weight 1-olefins can be used than can higher molecular weight 1-olefins. I prefer to use not more than 15 percent comonomer and preferably not more than 10 percent comonomer. Also, propylene, being the lowest molecular weight 1-olefin other than ethylene, is the preferred comonomer. However, the important feature is that the polymer being formed is a hard solid and any such 1-olefin which will polymerize to form such a compound is readily adaptable to this invention. As indicated, tacky polymers are also operable, however, the heat carrier will preferably be cleaned prior to recycling. While it is preferred that the polymer being formed is solid, the advantage of this invention can be obtained with semi-solid polymers especially during the initial stage of the polymerization, i.e., in the initial portion of the polymerization zone and during start-up operations, where the concentration of monomer is relatively high.

The polymerization is carried out at a temperature wherein the polymer being formed is a solid. These polymer particles are generally small having an average diameter of about 1/16 to 1/8 inch. The reaction temperature is maintained at a temperature below about 245° F. and preferably below about 230° F. in order to have only solid polymer in the reaction zone. While the polymerization can be carried out at lower temperatures, the reaction rate falls off rapidly below about 150° F. and is impractical below about 100° F. Therefore the preferred temperature range is 150 to 230° F.

The reactor can be of any desired shape and size provided with means for carrying the heat carrier along with reactants through the reaction zone. A particularly suitable reactor is a horizontally mounted tube equipped with a screw conveyor. Such a reactor is fully described and claimed in the copending application of W. C. Lanning, Serial No. 487,515, filed February 11, 1955. If desired, a portion of the polymer is recycled to aid in the dilution of the reaction.

This invention will be further described with reference to the attached drawing of which is a schematic flow diagram illustrating this invention utilizing the preferred type reactor. Also the invention is described in conjunction with the preferred gaseous phase polymerization, but it should be understood that liquid phase operation can be employed such as polymerization in the presence of a liquid hydrocarbon diluent.

Referring to the drawing, heat carrier, catalyst and olefin are introduced to screw conveyor reactor 1 via conduits 2, 3, and 4 respectively. This reactor is jacketed by jacket 5 which has coolant circulating therein as admitted via conduit 6 and removed via conduit 7. These materials are moved through the reactor by means of screw 8 which is mounted on shaft 9 which in turn is driven by motor 10. The shaft and screws are hollow and being so constructed as to be internally cooled by a coolant introduced via conduit 11 and removed via conduit 12. The olefin, catalyst and heat carrier are carried through the reactor via screw 8 and at the same time the olefin begins to polymerize giving off heat. The heat is absorbed by the heat carrier, the screw and the reactor and is carried out by the coolant and in part by the heat carrier. The heat carrier is also cooled by coming in contact with the screw and reactor walls. Additional olefin is added to the reactor at a plurality of positions along the reactor via conduits 13, 14, 15, and 16. Polymer produced in the upstream end of the reactor also helps to dilute the olefin and control the temperature in the downstream portion of the reactor. The product is removed via conduit 17 to a separation means 18. The polymer and catalyst is then removed via conduit 19 and the heat carrier via conduit 20. The heat carrier is recirculated.

The separation means 18 can be screening means where the polymer and heat carrier are substantially different in diameter. Alternatively, the polymer can be floated, for example by water, from the heavier heat carrier. In this case, the water would also serve as a means for cooling the heat carrier. If desired, to separate polymer from catalyst, the polymer can be dissolved either before or after separation from the carrier in a hydrocarbon solvent at high temperatures, e.g., 300° F. or higher. The catalyst can be regenerated if so desired by activation at high temperatures, e.g., 900–1000° F. in the presence of dry air or other oxygen containing gas. However, since the polymer yield per pound of catalyst is so high, it is seldom necessary to remove the catalyst.

In the above described reactor, polymer is continuously formed in the reactor as the conveyor carries the catalyst, heat carrier and polymer through the reactor, and therefore it is readily seen that the proportion of heat carrier present at points throughout the reactor decreases in the downstream direction. At the point of addition of the heat carrier and catalyst, substantially no polymer is present; the amount of catalyst present based on the heat carrier at this point will seldom, if ever, exceed 1 percent and can very well be less than 1/1000 percent. Thus, it is seen that the heat carrier at this point serves the very useful purpose of distributing the catalyst throughout a larger volume and allows the heat of reaction to pass to the heat carrier which serves as a reservoir to maintain the temperature at a desirable level during the time required for agitation to carry the heat carrier from the point of reaction to the heat transfer surface of the screw or reactor wall. In the absence of such a heat carrier or diluent at this point, the rate of reaction would be so high that excessive temperatures would be generated, thereby melting polymer causing the same to agglomerate and stick to the walls, screws, etc.

As the reaction mixture is carried through the conveyor reactor, larger amounts of polymer are produced which cut down the unit concentration of catalyst and this polymer further serves as a heat carrier in the apparatus. The heat carrying effect of this solid carrier, however, is highly favorable all through the reactor, for example, steel balls in the ratio of one volume for each five volumes of polymer approximately double the possible rate of reaction of ethylene for a unit volume at a given temperature rise.

The effect of addition of a solid heat carrier to the screw conveyor can be seen by comparing the allowable ethylene reaction for a pound of polyethylene present with an allowable temperature differential within the reactor of 20° F. In the absence of heat carrier material, 0.0069 pound of ethylene can be reacted for each time the agitator causes cooling of one pound of polymer by contact with the cooling surfaces. In the presence of one volume of steel balls for each 5 volumes of polymer, the 20° F. temperature rise allows 0.0153 pound of ethylene to be reacted for each pound of polymer cooled by contact with the cooling surface. This is due to the concurrent cooling of 5 pounds of steel carrier with the polymer. Thus, the amount of reaction is more than doubled with only a 20 percent increase in reactor size.

The above description shows that the presence of a heat carrier throughout the reaction zone in a screw conveyor type of reactor is quite beneficial. It is seen that the presence of the heat carrier is absolutely essential to the reactor in the upstream portion when no solvent is present, and that even with a large amount of polymer, a great benefit is obtained in temperature control. In the above description, 1-olefin feed is admitted to the reactor at a plurality of positions. This mode of operation is advantageous in that the feed is introduced as reaction proceeds minimizing high gas velocities within the reactor. However, it is within the scope of the invention to introduce the feed at one position, for example, along with the catalyst and heat carrier.

Specific embodiment

A screw-conveyor reactor of the type described is 30 feet in length, and 1 foot inside diameter with the heat being transferred through the walls and an internally cooled screw is used. The total heat transfer surface, of which about 55 percent is effective, is 135 ft.$^2$. Ethylene is charged at a rate of 100 lbs./hr. along with recycle unreacted ethylene in approximately equal amounts at 5 positions along the reactor as shown in the drawing. Also 500 lbs./hr. of 1/8 inch diameter stainless steel balls and 0.055 lb./hr. of microspherical catalyst (chromium oxide 2.5 percent chromium, and 90–10 silica-alumina support which had been activated in dry air at 950° F.) are charged to the reactor. The heat carrier is charged at about 200° F. The reactor operates at 450 p.s.i.g. and 220° F. maximum temperature. The residence time of heat carrier and catalyst is 1.5 hours. The product is 100 lbs./hr. of polymer at a yield of 1800 lbs./lb. of catalyst. The temperature differential between cooling surfaces and the moving particle bed in contact with it is approximately 40° F., corresponding to a heat transfer coefficient of about 50 B.t.u./hr./ft.$^2$/° F. for the effective surface. The steel balls aid in transferring heat from the reaction zone to the cooling surfaces and the heat transfer is considerably higher than could be obtained in the absence of the heat carrier material.

This invention has been described in a preferred embodiment. Those skilled in the art will see many modifications which can be made without departing from the scope and spirit of the invention. For example, the invention has been described in conjunction with ethylene as the feed, however, it is obvious that the same advantages are obtainable with other 1-olefin feeds such as have been described.

I claim:

1. In the vapor phase polymerization of 1-olefin of 2 to 8 carbon atoms and having no branching nearer the double bond than the 4-position to normally solid polymer at a temperature below the softening temperature of the polymer being formed and in contact with a polymerization catalyst in a polymerization zone the improvement whereby a greater throughout of 1-olefin through said polymerization zone is obtainable comprising transferring heat of polymerization from polymerization sites to heat transfer surfaces of said polymerization zone via inert solid heat carriers continuously passing through said polymerization zone along with the 1-olefin and catalyst, and continuously withdrawing said heat carrier, polymer and catalyst from said polymerization zone.

2. In the vapor phase polymerization of 1-olefins of 2 to 8 carbon atoms and having no branching nearer the double bond than the 4-position to normally solid polymer in contact with a catalyst comprising chromium oxide a portion of which is in hexavalent state in a polymerization zone having indirect heat removing means, the improvement whereby a greater throughput of 1-olefin through said polymerization zone is obtainable comprising maintaining the temperature of said polymerization zone at a temperature of at least 100° F. and below the softening point of the polymer being formed by transferring heat of polymerization from polymerization sites in said polymerization zone to said indirect heat removing means by means of inert solid heat carrier continuously passing through said polymerization zone along with catalyst and 1-olefin, said solid heat carrier being present in a weight ratio to the polymer being formed in a range 0.1:1 to 20:1, and continuously withdrawing said heat carrier, polymer and catalyst from said polymerization zone.

3. The improvement of claim 2 wherein the weight ratio of heat carrier to polymer is in the range 1:1 to 5:1.

4. In the vapor phase polymerization of 1-olefins comprising at least 85 weight percent of a 1-olefin selected from the group consisting of ethylene and propylene and the remaining 1-olefin being a 1-olefin of 2 to 8 carbon atoms per molecule and no branching nearer the double bond than the 4-position to solid polymer, said polymerization being carried out in vapor phase at a temperature in the range 100 to 245° F. and in contact with a suspended solid catalyst comprising hexavalent chromium as the oxide and in a polymerization zone being jacketed by indirect heat removing surfaces, the improvement comprising continuously introducing monomer, catalyst and solid inert heat carrier to said polymerization zone, continuously withdrawing catalyst, polymer and heat carrier from said polymerization zone, and transferring heat from polymerization sites in said polymerization zone to said heat removing surfaces, whereby a greater throughput of said monomer through said polymerization zone is obtainable.

5. The improvement of claim 4 wherein said heat carrier is selected from the group consisting of ceramics and metals, and said heat carriers are added to the polymerization zone at a ratio of carrier to polymer formed within the range 0.1:1.

6. The improvement of claim 5 wherein the heat carrier consists of metal balls having a diameter in the range 1/16 to 2 inches.

7. A process for vapor phase polymerizing 1-olefins of 2 to 8 carbon atoms and no branching nearer the double bond than the 4-position in contact with a polymerization catalyst comprising hexavalent chromium as the oxide to solid polymer, said process comprising continuously passing said 1-olefins and catalyst along with an inert solid heat carrier through a horizontal displaced elongated polymerization zone being jacketed with heat removing surfaces, conveying reactants and heat carrier through said zone by means of a screw operably mounted in said zone, maintaining the temperature in said zone within the range 100–245° F. by transferring heat of polymerization from polymerization sites to said heat removing surfaces by means of said heat carrier, whereby a greater throughput of 1-olefin through said polymerization zone is obtainable, and continuously removing polymer, catalyst and heat carrier from said polymerization zone.

8. The process of claim 7 wherein said heat carrier is present in a weight ratio of heat carrier to solid polymer in the range 0.1:1 to 20:1.

9. The process of claim 8 wherein the 1-olefin comprises at least 85 percent ethylene, the heat carrier consists of metal spheres having a diameter in the range 1/16 to 2 inches and the 1-olefin is introduced at a plurality of positions along the length of said reaction zone.

10. The process of claim 9 wherein the 1-olefin is ethylene and the metal spheres are steel.

11. The process of claim 9 wherein the 1-olefin is a mixture of ethylene and propylene and the metal spheres are steel.

References Cited in the file of this patent

UNITED STATES PATENTS

| | | |
|---|---|---|
| 2,561,226 | Powers | July 17, 1951 |
| 2,644,799 | Robinson | July 7, 1953 |
| 2,715,117 | Baeyaert | Aug. 9, 1955 |
| 2,745,823 | Hewitt | May 15, 1956 |
| 2,779,752 | Vining | Jan. 29, 1957 |
| 2,825,721 | Hogan et al. | Mar. 4, 1958 |

FOREIGN PATENTS

| | | |
|---|---|---|
| 499,680 | Canada | Feb. 4, 1954 |
| 530,617 | Belgium | Jan. 24, 1955 |